United States Patent
Ponce

(10) Patent No.: US 8,179,555 B2
(45) Date of Patent: May 15, 2012

(54) PRINTING AND FINISHING CAPABILITY FOR CUSTOMIZED DOCUMENT PRODUCTION SYSTEM AND METHOD

(75) Inventor: Rafael Antonio Martinez Ponce, Zapopan Jalisco (MX)

(73) Assignee: Hewlett-Packard Development Company, L.P., Houston, TX (US)

(*) Notice: Subject to any disclaimer, the term of this patent is extended or adjusted under 35 U.S.C. 154(b) by 2741 days.

(21) Appl. No.: 10/096,123

(22) Filed: Mar. 8, 2002

(65) Prior Publication Data

US 2003/0169451 A1    Sep. 11, 2003

(51) Int. Cl.
*G06K 1/00* (2006.01)
*G06F 15/00* (2006.01)

(52) U.S. Cl. ........................ 358/1.18; 715/251

(58) Field of Classification Search ............... 358/1.18; 705/16, 27.1, 30, 24, 50; 717/109; 715/209, 715/249, 251, 256; 709/217
See application file for complete search history.

(56) References Cited

U.S. PATENT DOCUMENTS

| | | | |
|---|---|---|---|
| 4,928,949 A | 5/1990 | Ramsey et al. | |
| 5,189,608 A * | 2/1993 | Lyons et al. | 705/30 |
| 5,267,155 A | 11/1993 | Buchanan et al. | |
| 5,465,213 A | 11/1995 | Ross | |
| 5,615,123 A | 3/1997 | Davidson et al. | |
| 5,621,864 A | 4/1997 | Benade et al. | |
| 5,649,216 A | 7/1997 | Sieber | |
| 5,765,142 A * | 6/1998 | Allred et al. | 705/26 |
| 5,845,302 A | 12/1998 | Cyman, Jr. et al. | |
| 5,860,073 A | 1/1999 | Ferrel et al. | |
| 5,893,914 A | 4/1999 | Clapp | |
| 5,930,810 A | 7/1999 | Farros et al. | |
| 5,930,811 A | 7/1999 | Nojima et al. | |
| 5,983,227 A | 11/1999 | Nazem et al. | |
| 6,011,758 A | 1/2000 | Dockes et al. | |
| 6,012,070 A | 1/2000 | Cheng et al. | |
| 6,012,071 A | 1/2000 | Krishna et al. | |
| 6,012,890 A | 1/2000 | Garrido | |
| 6,026,433 A | 2/2000 | D'Arlach et al. | |
| 6,507,856 B1 | 1/2003 | Chen et al. | |
| 6,684,369 B1 | 1/2004 | Bernardo et al. | |
| 6,704,120 B1 * | 3/2004 | Leone III et al. | 358/1.18 |
| 6,769,606 B1 * | 8/2004 | Blosser et al. | 705/24 |
| 6,832,351 B1 | 12/2004 | Batres | |
| 6,907,564 B1 | 6/2005 | Burchhardt et al. | |

(Continued)

FOREIGN PATENT DOCUMENTS

EP    0784394    7/1997

(Continued)

OTHER PUBLICATIONS

Priestley, Michael, "Dynamically Assembled Documentation", ACM Special Interest Group for Design of Communications, Proceedings of the 17th annual international conference on Computer documentation, 1999, pp. 53-57, ACM Press, New York, NY.

*Primary Examiner* — Kimberly A Williams

(57) ABSTRACT

A method of producing a customized document with a printing and finishing system includes registering a capability of the printing and finishing system, designing at least one intelligent template for the customized document based on the capability of the printing and finishing system, customizing the at least one intelligent template based on the capability of the printing and finishing system, including creating an intelligent document, and producing the customized document with the printing and finishing system based on the intelligent document.

22 Claims, 13 Drawing Sheets

U.S. PATENT DOCUMENTS

| | | | |
|---|---|---|---|
| 6,965,912 B2 | 11/2005 | Friedman et al. | |
| 7,024,620 B2 * | 4/2006 | Ponce et al. | 715/209 |
| 7,107,284 B1 | 9/2006 | Betz et al. | |
| 7,580,892 B1 * | 8/2009 | Blosser et al. | 705/50 |
| 7,870,287 B2 * | 1/2011 | Nakaoka et al. | 709/227 |
| 2001/0051962 A1 | 12/2001 | Plotkin | |
| 2002/0025085 A1 | 2/2002 | Gustafson et al. | |
| 2002/0059278 A1 | 5/2002 | Bailey et al. | |
| 2003/0023626 A1 | 1/2003 | Bretti | |
| 2003/0090723 A1 * | 5/2003 | Schmidt-Joos et al. | 358/1.18 |
| 2003/0140053 A1 | 7/2003 | Vasey | |
| 2003/0140315 A1 | 7/2003 | Blumberg et al. | |
| 2003/0144982 A1 | 7/2003 | Reulein et al. | |
| 2003/0172057 A1 * | 9/2003 | Ponce et al. | 707/3 |
| 2003/0172354 A1 * | 9/2003 | Martinez Ponce | 715/517 |
| 2003/0172355 A1 * | 9/2003 | Ponce et al. | 715/517 |
| 2003/0208556 A1 | 11/2003 | Friedman et al. | |
| 2004/0207877 A1 * | 10/2004 | Benstein | 358/1.18 |

FOREIGN PATENT DOCUMENTS

| | | |
|---|---|---|
| GB | 2401464 A | 11/2004 |
| WO | 96/13781 | 5/1996 |
| WO | 98/08176 | 2/1998 |
| WO | 00/63820 | 10/2000 |
| WO | 01/11491 A1 | 2/2001 |
| WO | 01/31488 A2 | 5/2001 |
| WO | 01/35056 A1 | 5/2001 |
| WO | 01/84299 A1 | 11/2001 |
| WO | 03/061474 A1 | 7/2003 |

* cited by examiner

PRINTING AND FINISHING CAPABILITY FOR CUSTOMIZED DOCUMENT PRODUCTION SYSTEM AND METHOD

CROSS-REFERENCE TO RELATED APPLICATIONS

This patent application is related to Non-Provisional U.S. patent application Ser. No. 10/093,627, entitled "POINT-OF-NEED DOCUMENT PRODUCTION SYSTEM AND METHOD", filed on even date herewith, assigned to the assignee of the present invention, and incorporated herein by reference; Non-Provisional U.S. patent application Ser. No. 10/096,122, entitled "CUSTOMIZED DOCUMENT PRODUCTION SYSTEM AND METHOD", filed on even date herewith, assigned to the assignee of the present invention, and incorporated herein by reference; and Non-Provisional U.S. patent application Ser. No. 10/094,062, entitled "ADMINISTRATION OF CUSTOMIZED DOCUMENT PRODUCTION SYSTEM AND METHOD", filed on even date herewith, assigned to the assignee of the present invention, and incorporated herein by reference.

THE FIELD OF THE INVENTION

The present invention relates generally to document production, and more particularly to printing and finishing capability for production of a customized document.

BACKGROUND OF THE INVENTION

Typically, creation, production, and distribution of customized documents is often logistically complex, lengthy, expensive, and, in many instances, not feasible for small runs. As such, published documents such as marketing material or communications, for example, are created so as to appeal to large audiences of customers, produced in high volume runs for economies of scale, and widely distributed for ease of dissemination. Such approach, however, results in marketing material or communications which are often too general and/or untargeted for specific customers. For example, while only certain portions or sections of the marketing material or communication may be relevant to a customer, the customer must possess the entire document. Unfortunately, a user of the marketing material or communication, such as a sales representative interacting with the customer, is unable to customize and/or personalize the marketing material or communication for the customer.

According, a need exists for producing customized and/or personalized documents for a user and/or a customer at a point-of-need.

SUMMARY OF THE INVENTION

One aspect of the present invention provides a method of producing a customized document with a printing and finishing system. The method includes registering a capability of the printing and finishing system, designing at least one intelligent template for the customized document based on the capability of the printing and finishing system, customizing the at least one intelligent template based on the capability of the printing and finishing system, including creating an intelligent document, and producing the customized document with the printing and finishing system based on the intelligent document.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
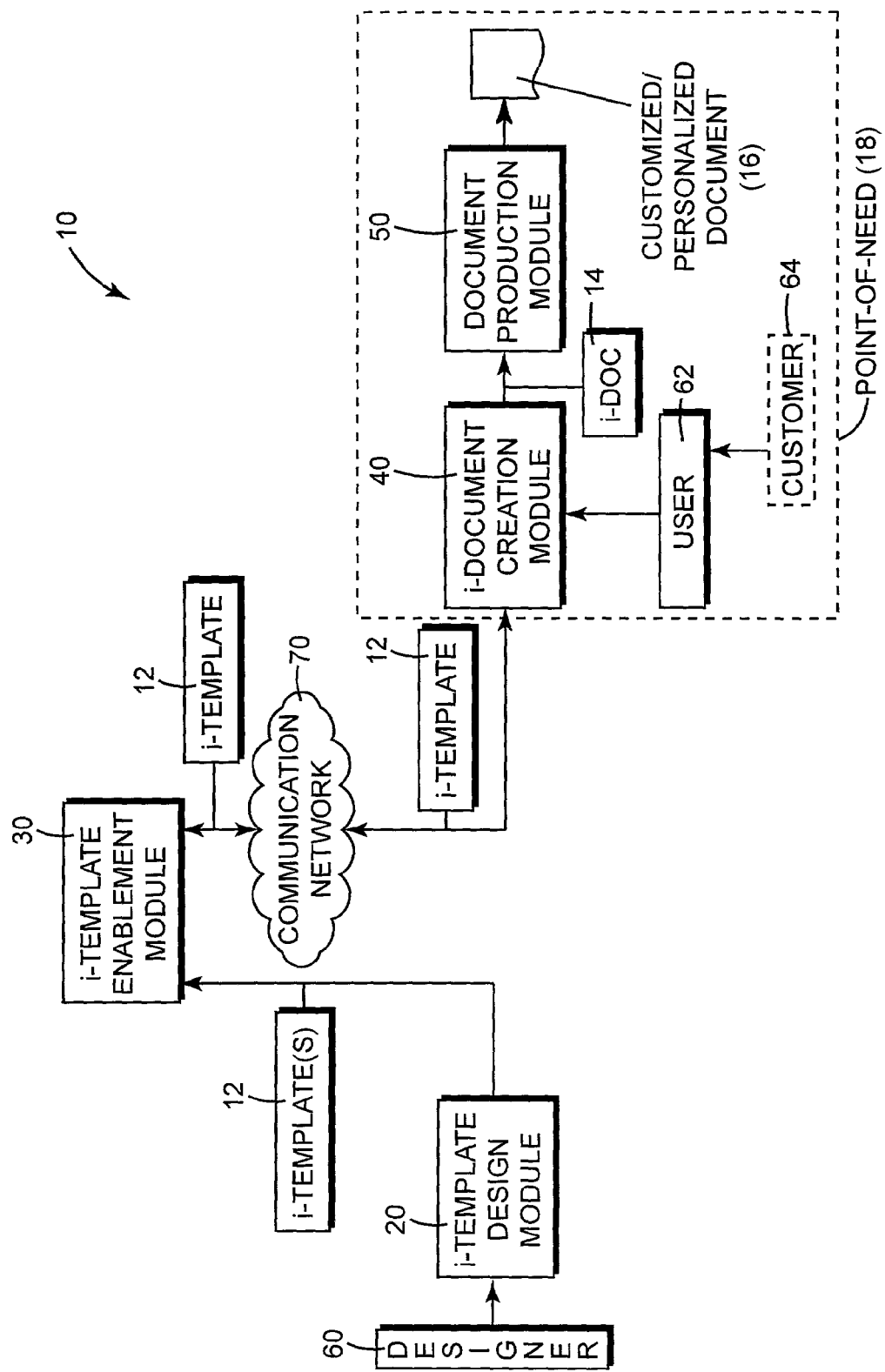
FIG. 1 is a block diagram illustrating one exemplary embodiment of a document production system according to the present invention.

A document production system according to the present invention is illustrated generally at 10 in FIG. 1. Document production system 10 facilitates design of one or more intelligent templates 12, creation of an intelligent document 14 based on one of the intelligent templates 12, and production of a customized and/or personalized document 16 from intelligent document 14, as described in detail below. For clarity, intelligent template 12 and intelligent document 14 are referred to, hereinafter, as i-template 12 and i-doc 14, respectively.

In one exemplary embodiment, document production system 10 includes an intelligent template design module 20, an intelligent template enablement module 30, an intelligent document creation module 40, and a document production module 50. Intelligent template design module 20 facilitates design of i-template 12 and intelligent template enablement module 30 enables use of itemplate 12. As such, intelligent document creation module 40 facilitates retrieval of i-template 12 from intelligent template enablement module 30 and creation of i-doc 14 based on i-template 12. Thus, document production module 50 produces customized/personalized document 16 based on i-doc 14. For clarity, intelligent template design module 20, intelligent template enablement module 30, and intelligent document creation module 40 are referred to, hereinafter, as i-template design module 20, i-template enablement module 30, and i-document creation module 40, respectively.

In one exemplary embodiment, a designer 60 interacts with i-template design module 20 to design one or more i-templates 12. As such, i-templates 12 are enabled so as to be available for use by, for example, a user 62 of document production system 10 to create i-doc 14 which, in turn, is used to create customized/personalized document 16, as described in detail below. To enable use of i-templates 12 by user 62, i-templates 12 are registered with i-template enablement module 30. As such, i-template enablement module 30 enables use of i-templates 12 by managing and maintaining i-templates 12 and forwarding i-templates 12 to i-document creation module 40, as described in detail below. Thus, i-template design module 20 facilitates design of one or more i-templates 12 for customized/personalized document 16.

In one exemplary embodiment, user 62 interacts with i-document creation module 40 to create i-doc 14 on behalf of and/or for a customer 64 requesting or desiring customized/personalized document 16. It is, however, within the scope of the present invention for customer 64 to directly interact with i-document creation module 40 to create i-doc 14.

Based on i-doc 14, document production module 50 produces customized/personalized document 16 for user 62 and/or customer 64. More specifically, document production module 50 produces a hard copy and/or an electronic copy of customized/personalized document 16, as described in detail below.

In one exemplary embodiment, creation of i-doc 14 and production of customized/personalized document 16 are performed from and/or at a point-of-need, as defined by dashed line 18. The point-of-need is defined, for example, as a location where customized/personalized document 16 is required. The point-of-need, therefore, includes, for example, a location of user 62 and/or a location of customer 64. As such, i-document creation module 40 and document production module 50 are located at the point-of-need.

In one exemplary embodiment, i-template enablement module 30 and idocument creation module 40 communicate with each other via a communication network 70. Communication network 70, as used herein, is defined to include a local-area network (LAN) and/or a wide-area network (WAN). Communication network 70, therefore, may include an intranet communication network, an Internet communication network, or a similar high-speed communication network including a wireless communication network.

In one exemplary embodiment, i-template enablement module 30 and i-document creation module 40 including, for example, the point-of-need are located remote from each other (i.e., at different locations). Thus, communications between i-template enablement module 30 and i-document creation module 40 are conducted over communication network 70. It is, however, within the scope of the present invention for i-template enablement module 30 and i-document creation module 40 to be located at the same location. Thus, i-template enablement module 30 and i-document creation module 40 may communicate in other manners (e.g., a direct connection or communication link).

Components of document production system 10, including i-template design module 20, i-template enablement module 30, i-document creation module 40, and/or document production module 50, can be implemented in hardware via a microprocessor, programmable logic device, or state machine, in firmware, or in software within a given device. In one exemplary embodiment, at least a portion of software programming for document production system 10 is written in JAVA programming language and each of the main components including, more specifically, i-template enablement module 30 and i-document creation module 40 communicate via communication network 70 using a communication bus protocol. For example, the present invention may or may not use a TCP/IP protocol suite for data transport. Other programming languages and communication bus protocols suitable for use with the present invention will become apparent to those skilled in the art after reading the present application.

Figure 2:
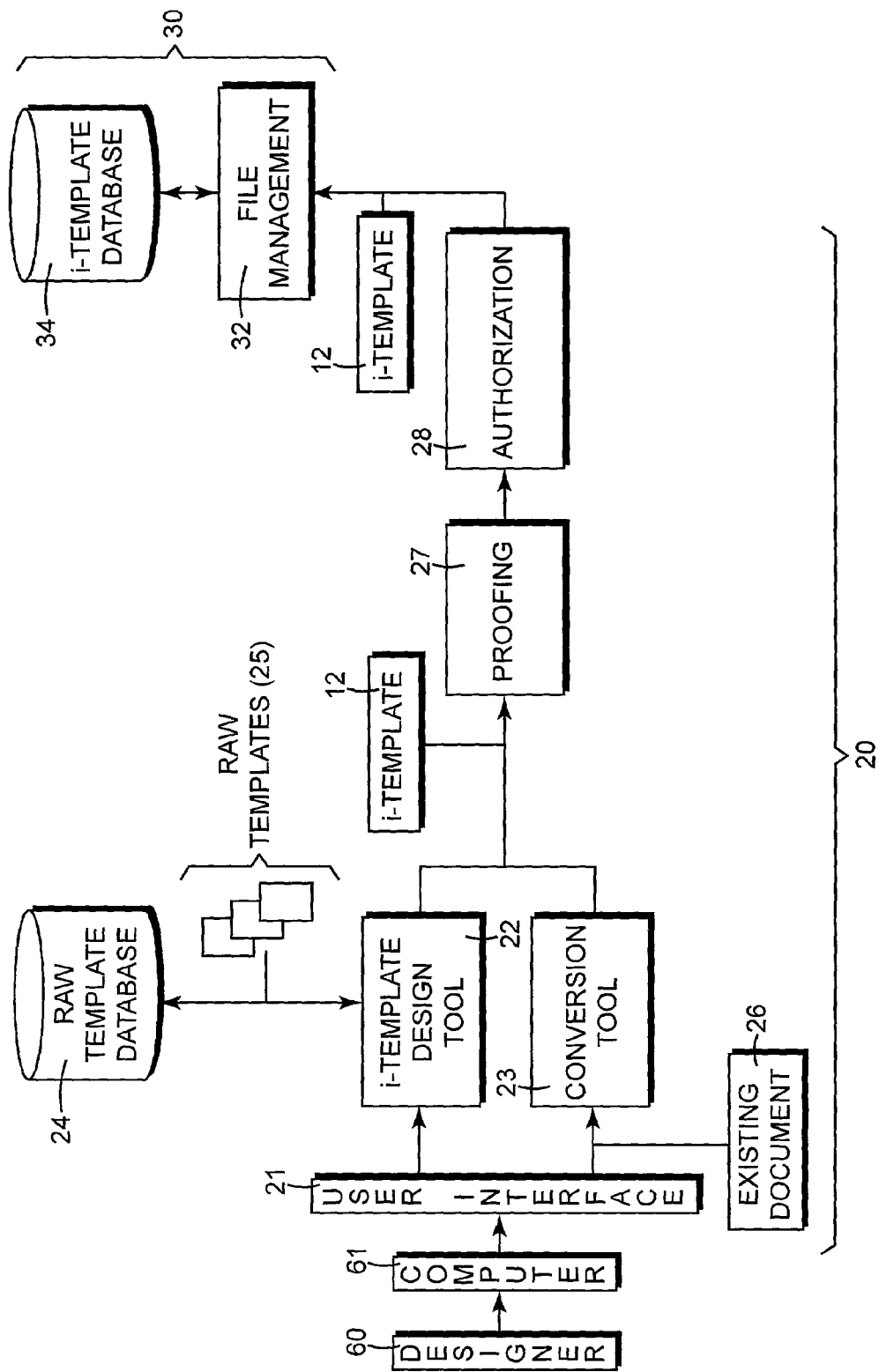
FIG. 2 is a block diagram illustrating one exemplary embodiment of a portion of the document production system of FIG. 1.

As illustrated in FIG. 2, designer 60 interacts with i-template design module 20 via a computer 61. Computer 61 may include, for example, an input device such as a keyboard and/or a mouse, and a display device such as a monitor, as is well known in the art. In addition, computer 61 may be an appliance such as a personal digital assistant (PDA), cellular phone, etc.

In one exemplary embodiment, computer 61 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

Designer 60 interacts with a user interface 21 of i-template design module 20 via computer 61 to create and/or design i-template 12 for customized/personalized document 16 and register i-template 12 with i-template enablement module 30. In one exemplary embodiment, i-template design module 20 includes an i-template design tool 22 and a conversion tool 23. I-template design tool 22 includes, for example, an i-template creation wizard which facilitates creation of i-template 12 by guiding designer 60 through the steps of designing i-template 12.

I-template design tool 22 communicates with a raw template database 24 which maintains a plurality of raw templates 25 for use by designer 60 during the creation of i-template 12. Examples of raw template database 24 include non-volatile memory (e.g., a hard disk drive or other persistent storage device) and may include volatile memory (e.g., random access memory (RAM)). Another example of raw template database 24 includes a relational database management server (RDBMS).

With conversion tool 23, designer 60 can create i-template 12 for customized/personalized document 16 based on an existing document 26. More specifically, conversion tool 23 converts existing document 26 into i-template 12.

In one exemplary embodiment, i-template design module 20 also includes a proofing system 27 and an authorization system 28. With proofing system 27, designer 60 can review and proof i-template 12, including soft and/or hard proofing of i-template 12. At authorization system 28, i-template 12 is reviewed and approved or authorized for use by, for example, designer 60 and/or management of document production system 10.

After creation or design of i-template 12, i-template 12 is registered with i-template enablement module 30. As such, i-template enablement module 30 enables use of i-template 12 by managing and maintaining i-template 12. I-template enablement module 30 enables electronic use or e-enables i-template 12 for use by user 62 via i-document creation module 40, as described below.

In one exemplary embodiment, to manage and maintain i-template 12, i-template enablement module 30 includes a file management system 32 and an i-template database 34. File management system 32 provides file management services for i-template 12, such as security and revision control, as well as access to i-template database 34. I-template database 34 maintains or stores a plurality of i-templates 12 as designed by i-template design module 20. Examples of i-template database 34 include non-volatile memory (e.g., a hard disk drive or other persistent storage device) and may include volatile memory (e.g., random access memory (RAM)). Another example of i-template database 34 includes a relational database management server (RDBMS).

Figure 3:
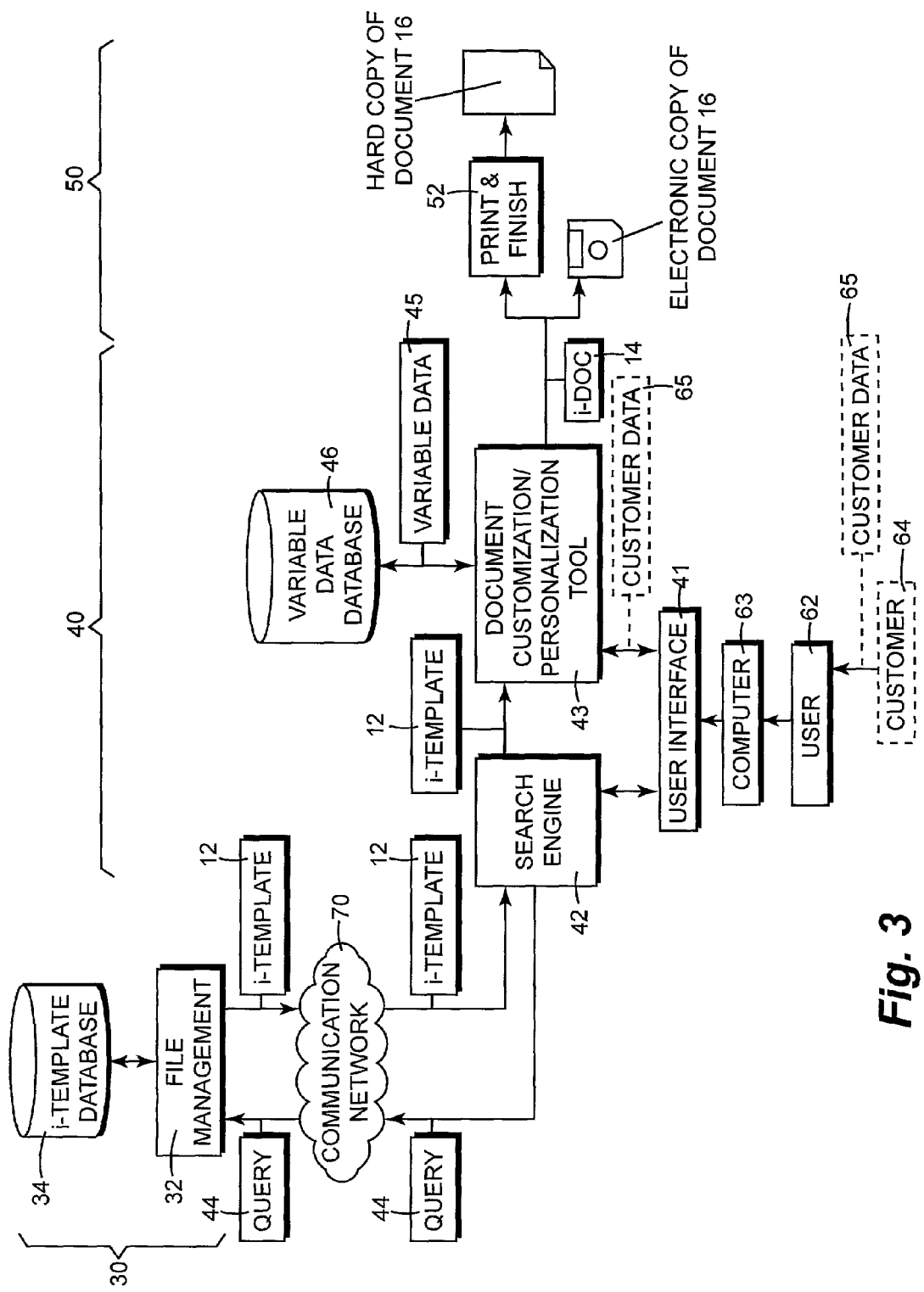
FIG. 3 is a block diagram illustrating one exemplary embodiment of another portion of the document production system of FIG. 1.

As illustrated in FIG. 3, user 62 interacts with i-document creation module 40 via a computer 63. Computer 63 may include, for example, an input device such as a keyboard and/or a mouse, and a display device such as a monitor, as is well known in the art. In addition, computer 61 may be an appliance such as a personal digital assistant (PDA), cellular phone, etc.

In one exemplary embodiment, computer 63 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

User 62 interacts with a user interface 41 of i-document creation module 40 via computer 63 to create i-doc 14. In one exemplary embodiment, i-document creation module 40 includes a search engine 42 and a document customization/personalization tool 43. Through search engine 42, user 62 submits a query 44 to i-template enablement module 30 for i-template 12. As such, file management system 32 of i-template enablement module 30 receives and processes query 44. As such, user 62 searches i-template database 34 of i-template enablement module 30 for an appropriate i-template 12 for customized/personalized document 16. Thus, when user 62 identifies or selects i-template 12 for customized/personalized document 16, file management system 32 manages transfer or downloading of i-template 12 to i-document creation module 40. Preferably, user 62 submits query 44 to i-template enablement module 30 and i-template enablement module 30 transfers or downloads i-template 12 to i-document creation module 40 via communication network 70.

With document customization/personalization tool 43, user 62 customizes and/or personalizes i-template 12 to create i-doc 14. In one exemplary embodiment, user 62 customizes and/or personalizes i-template 12 based on customer data 65 of customer 64. User 62 collects customer data 65 from customer 64 at, for example, the point-of-need. Collection of customer data 65 by user 62 includes submission of customer data 65 by customer 64 to user 62. Customer data 65 includes, for example, identification of customer 64, input of customer 64, a specification of customer 64, and/or a selection by customer 64. User 62 may also customize and/or personalize i-template 12 by selecting and/or excluding a specific portion or portions of i-template 12.

In one exemplary embodiment, customer data 65 and other data for creating i-doc 14 form variable data 45 for i-doc 14. Variable data 45 includes, for example, text, an image, and/or a calculation for i-doc 14. As such, document customization/personalization tool 43 merges variable data 45, including customer data 65, with i-template 12 to create i-doc 14.

Variable data 45, including customer data 65, is stored or maintained, for example, by a variable data database 46. Examples of variable data database 46 include non-volatile memory (e.g., a hard disk drive or other persistent storage device) and may include volatile memory (e.g., random access memory (RAM)). Another example of variable data database 46 includes a relational database management server (RDBMS).

In one exemplary embodiment, document customization/personalization tool 43 automatically modifies a format of i-template 12 for creation of i-doc 14. Document customization/personalization tool 43 modifies, for example, a page layout of i-template 12 and/or a font of i-template 12. Document customization/personalization tool 43 modifies the page layout of i-template 12 by modifying, for example, one or more margins of i-template 12, paragraph justification of i-template 12, hyphenation of i-template 12, and/or orientation of i-template 12. Document customization/personalization tool 43 modifies the font of i-template 12 by modifying, for example, a font size of i-template 12, a font style of i-template 12, a font type of i-template 12, and/or font properties of i-template 12. In addition, document customization/personalization tool 43 modifies variable data 45 of i-doc 14. Document customization/personalization tool 43 modifies, for example, size, resolution, and/or orientation of an image for i-doc 14.

Figure 4:
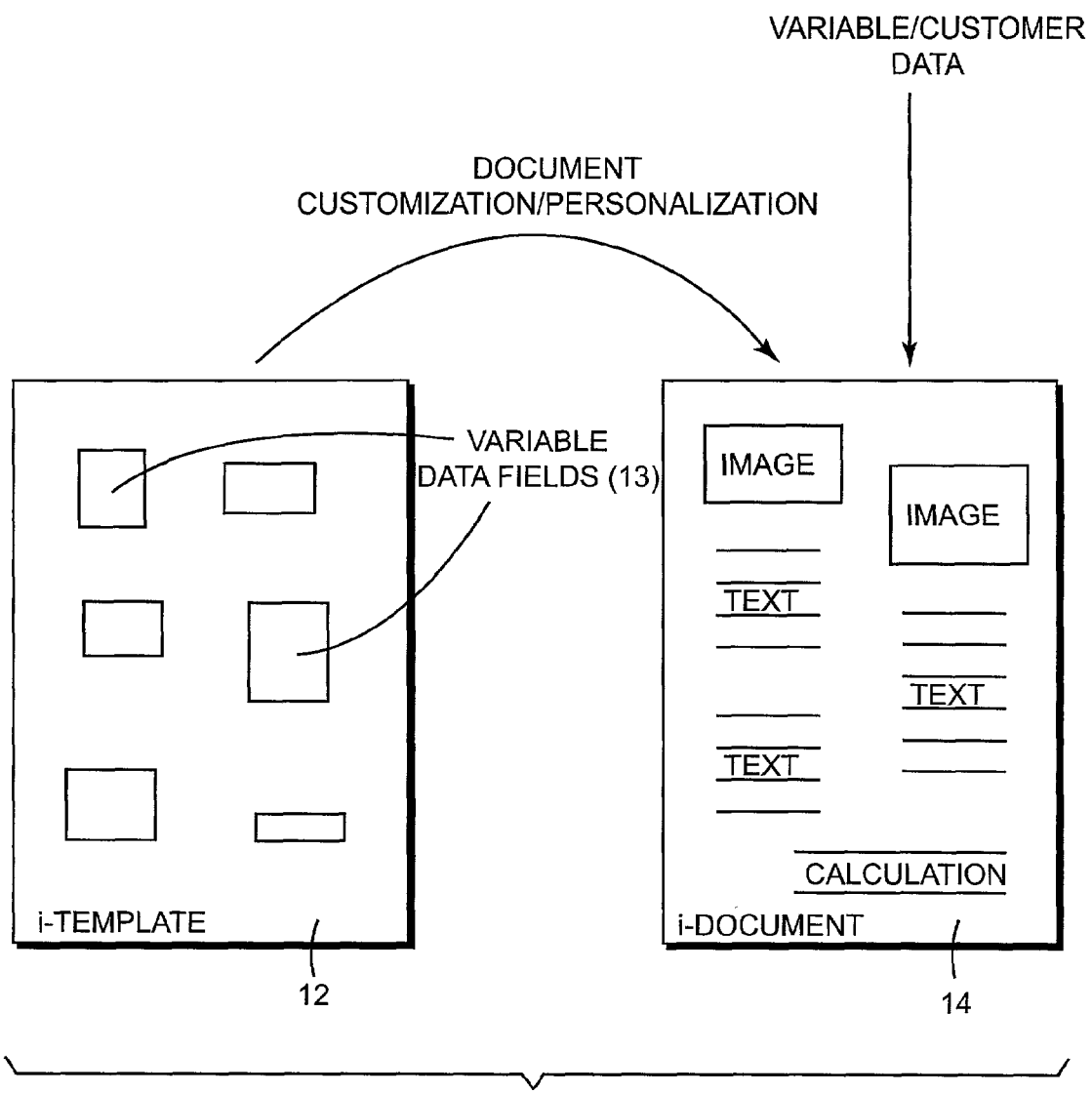
FIG. 4 is a schematic illustration of one exemplary embodiment of an intelligent template and an intelligent document created from the intelligent template according to the present invention.

In one exemplary embodiment, as illustrated in FIG. 4, i-template 12 includes one or more variable data fields 13. As such, i-doc 14 is customized and/or personalized by filling variable data fields 13 with variable data 45, such as customer data 65. More specifically, i-document creation module 40 merges variable data 45, including customer data 65, with i-template 12 to create i-doc 14. Preferably, i-document creation module 40 automatically adjusts variable data fields 13 to accommodate variable data 45 and/or customer data 65.

Returning to FIG. 3, based on i-doc 14, document production module 50 produces customized/personalized document 16. More specifically, document production module 50 produces a printed or hard copy of customized/personalized document 16 and/or an electronic copy of customized/personalized document 16. To produce a hard copy of customized/personalized document 16, document production module 50 includes a printing and finishing system 52. In one exemplary embodiment, printing and finishing system 52 provides, for example, various printing and/or finishing options for customized/personalized document 16 such as single-sided, double-sided, portrait, landscape, stapled, side-stitched, etc.

Figure 5:
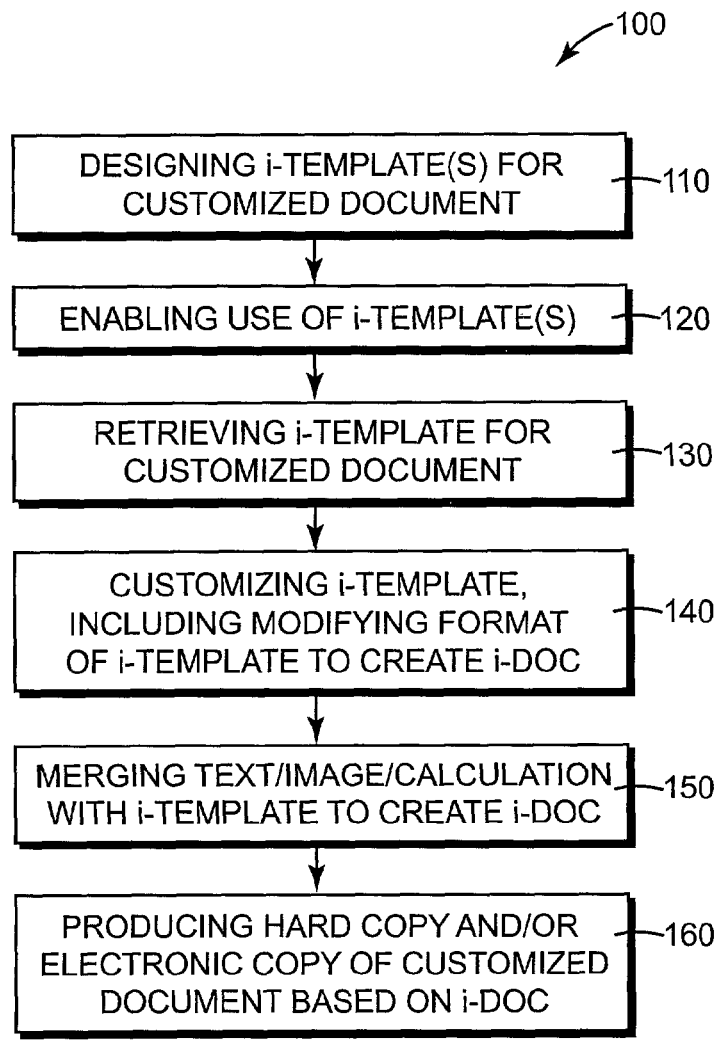
FIG. 5 is a flow diagram illustrating one exemplary embodiment of a method of producing a customized document according to the present invention.

In FIG. 5, a flow diagram illustrating one exemplary embodiment of a method of producing customized/personalized document 16 according to the present invention is illustrated generally at 100. Reference is also made to FIGS. 1-4.

At step 110, one or more i-templates 12 for customized/personalized document 16 are designed. In one exemplary embodiment, i-template 12 is designed, for example, by designer 60 via i-template design module 20. As such, i-template 12 is designed by using i-template design tool 22 or conversion tool 23 of i-template design module 20, as described above with reference to FIG. 2.

At step 120, i-template 12, as designed, for example, with i-template design module 20, is enabled for use. More specifically, i-template 12 is made available electronically or e-enabled by i-template enablement module 30, as described above with reference to FIG. 2.

At step 130, i-template 12 for customized/personalized document 16 is retrieved from i-template enablement module 30. More specifically, user 62 searches and selects i-template 12 from i-template database 34 by using search engine 42 of i-document creation module 40, as described above with reference to FIG. 3.

At step 140, i-template 12 is customized and/or personalized to create i-doc 14. In one exemplary embodiment, i-template 12 is customized by modifying a format of i-template 12 such as a page layout and/or a font of i-template 12. I-template 12 is modified, for example, by i-document creation module 40, as described above with reference to FIG. 3.

At step 150, i-template 12 is further customized and/or personalized by merging variable data 45 such as text, an image, and/or a calculation with i-template 12 to create i-doc 14. In one exemplary embodiment, i-template 12 is modified to accommodate variable data 45. As such, modifying the format of i-template 12 includes, for example, modifying a size, resolution, and/or orientation of the image merged with i-template 12 to create i-doc 14.

At step 160, a hard copy and/or an electronic copy of customized/personalized document 16 is produced based on i-doc 14. A hard copy of customized/personalized document 16 is produced, for example, by printing and finishing system 52 of document production module 50.

Figure 6:
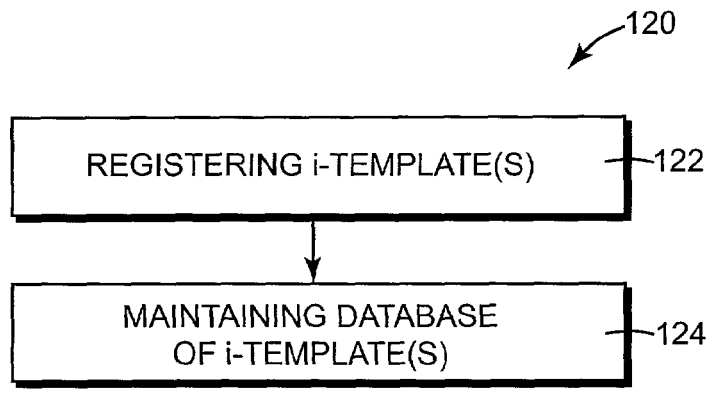
FIG. 6 is a flow diagram illustrating one exemplary embodiment of enabling use of an intelligent template in the method of FIG. 5.

In one exemplary embodiment, as illustrated in FIG. 6, enabling use of i-template 12 in step 120 includes registering of i-template 12, as indicated in step 122, and maintaining a database including i-template 12, as indicated in step 124. I-template 12 is enabled and maintained by file management system 32 and i-template database 34 of i-template enablement module 30, as described above.

In one exemplary embodiment, steps 110-160, including steps 122-124, of method 100 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

Figure 7:
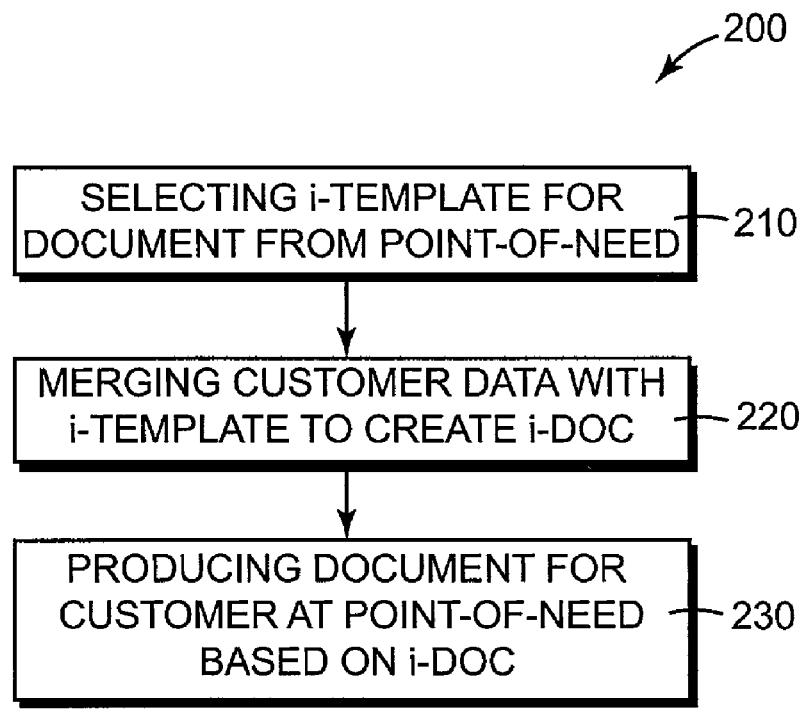
FIG. 7 is a flow diagram illustrating one exemplary embodiment of a method of producing a document for a customer at a point-of-need.

In FIG. 7, a flow diagram illustrating one exemplary embodiment of a method of producing customized/personalized document 16 for customer 64 at the point-of-need according to the present invention is illustrated generally at 200. Reference is also made to FIGS. 1-4. As described above, production of customized/personalized document 16 for customer 64 may be initiated by user 62 on behalf of customer 64 as well as directly by customer 64.

At step 210, i-template 12 for customized/personalized document 16 is selected from the point-of-need. I-template 12 is selected, for example, by submitting query 44 to i-template enablement module 30 and searching i-template database 34. As such, i-template 12 is selected and downloaded from i-template enablement module 30, as described above with reference to FIG. 3.

At step 220, customer data 65 of customer 64 is merged with i-template 12 to create i-doc 14. Customer data 65 is merged with i-template 12 by, for example, document customization/personalization tool 43 of i-document creation module 40. In one exemplary embodiment, customer data 65 is merged with i-template 12 by filling variable data fields 13 of i-template 12, as described above and illustrated, for example, in FIG. 4.

At step 230, customized/personalized document 16 for customer 64 is produced at the point-of-need based on i-doc 14. More specifically, a hard copy and/or an electronic copy of customized/personalized document 16 is produced by document production module 50, as described above with reference to FIG. 3.

Figure 8:
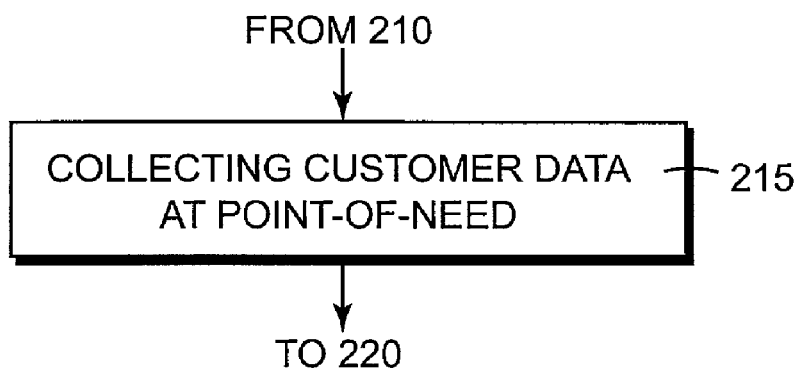
FIG. 8 is a flow diagram illustrating another exemplary embodiment of a portion of the method of FIG. 7.

In one exemplary embodiment, as illustrated in FIG. 8, producing customized/personalized document 16 for customer 64 in method 200 includes collecting customer data 65 from customer 64 at the point-of-need, as indicated in step 215. As such, customer data 65 collected at the point-of-need is merged with i-template 12 in step 220 to create i-doc 14. In one exemplary embodiment, customer data 65, as a form of variable data 45, is stored in variable data database 46.

In one exemplary embodiment, steps 210-230, including step 215, of method 200 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

In one illustrative embodiment, document production system 10 is used by user 62 to create customized and/or personalized marketing material or communication for customer 64. As such, user 62 includes, for example, a sales representative interacting with customer 64. Thus, the sales representative selects i-template 12, as designed, for example, by designer 60 associated with the sales representative, and customizes and/or personalizes i-template 12 to create customized/personalized document 16 for customer 64.

The sales representative customizes and/or personalizes i-template 12 by collecting and merging customer data 65 of customer 64 and/or other variable data 45 with i-template 12 via document customization/personalization tool 43. As such, i-doc 14 is created by i-document creation module 40 with interaction by the sales representative. Thus, customized/personalized document 16 is produced for customer 64 at the point-of-need based on i-doc 14.

System Administration

Figure 9:
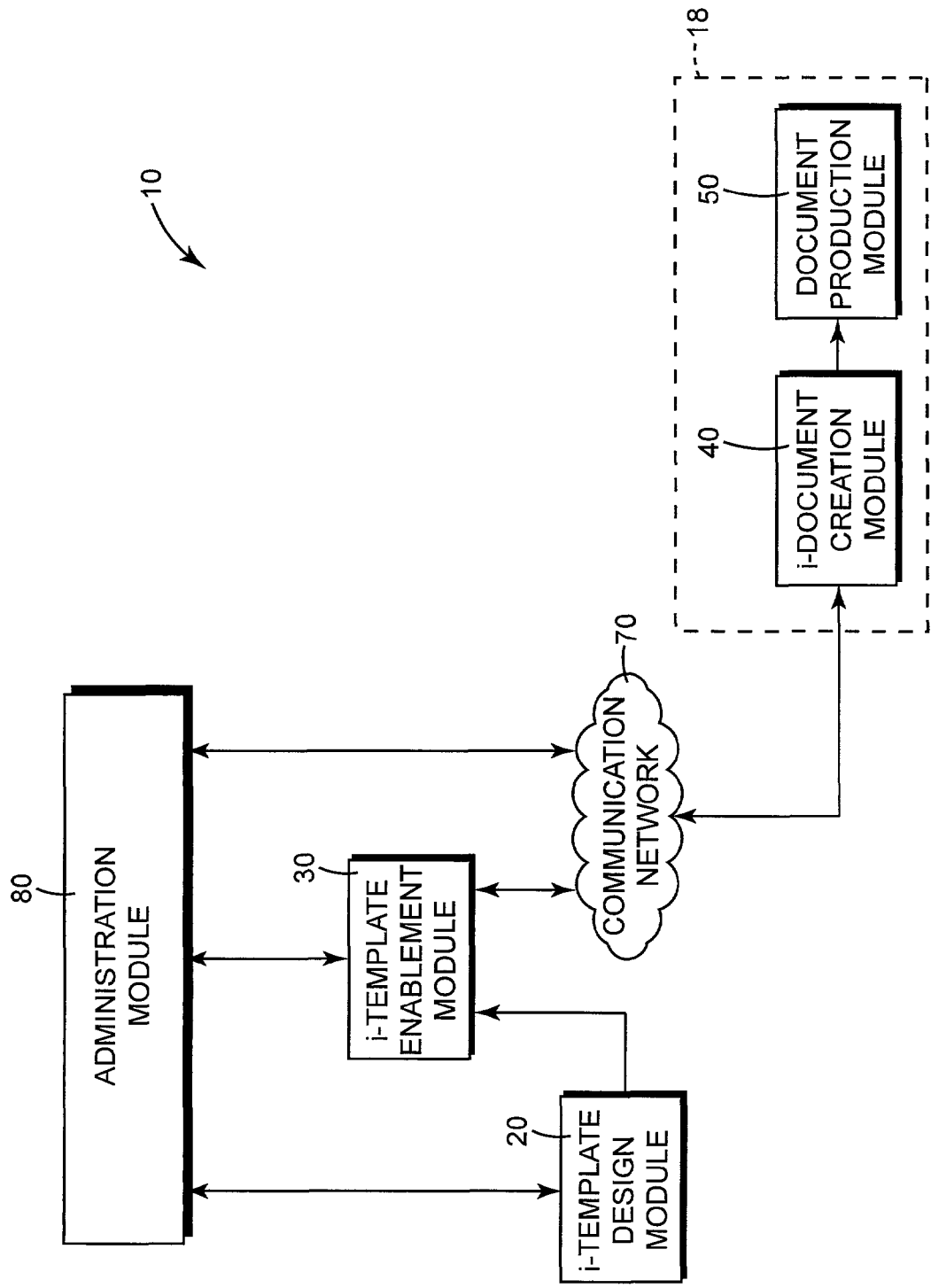
FIG. 9 is a block diagram illustrating one exemplary embodiment of a document production system including system administration according to the present invention.

In one exemplary embodiment, as illustrated in FIG. 9, document production system 10 includes an administration module 80. Administration module 80 monitors and/or manages operation and/or activities of document production system 10 including, more specifically, i-template design module 20, i-template enablement module 30, i-document creation module 40, and/or document production module 50, as described in detail below.

In one exemplary embodiment, i-template design module 20, i-template enablement module 30, and administration module 80 are located at a first location, and i-document creation module 40 and document production module 50 are located at a second location remote from the first location. More specifically, i-document creation module 40 and document production module 50 are located at the point-of-need, as defined by dashed line 18 and described above. As such, administration module 80 communicates with i-document creation module 40 and document production module 50 via communication network 70. Administration module 80, however, communicates with i-template design module 20 and i-template enablement module 30 via, for example, a direct connection or communication link.

Similar to that described above with reference to i-template design module 20, i-template enablement module 30, i-document creation module 40, and/or document production module 50, administration module 80 can be implemented in hardware via a microprocessor, programmable logic device, or state machine, in firmware, or in software within a given device. In addition, i-document creation module 40 and/or document production module 50 communicate with administration module 80 via communication network 70 using a communication bus protocol.

Figure 10:
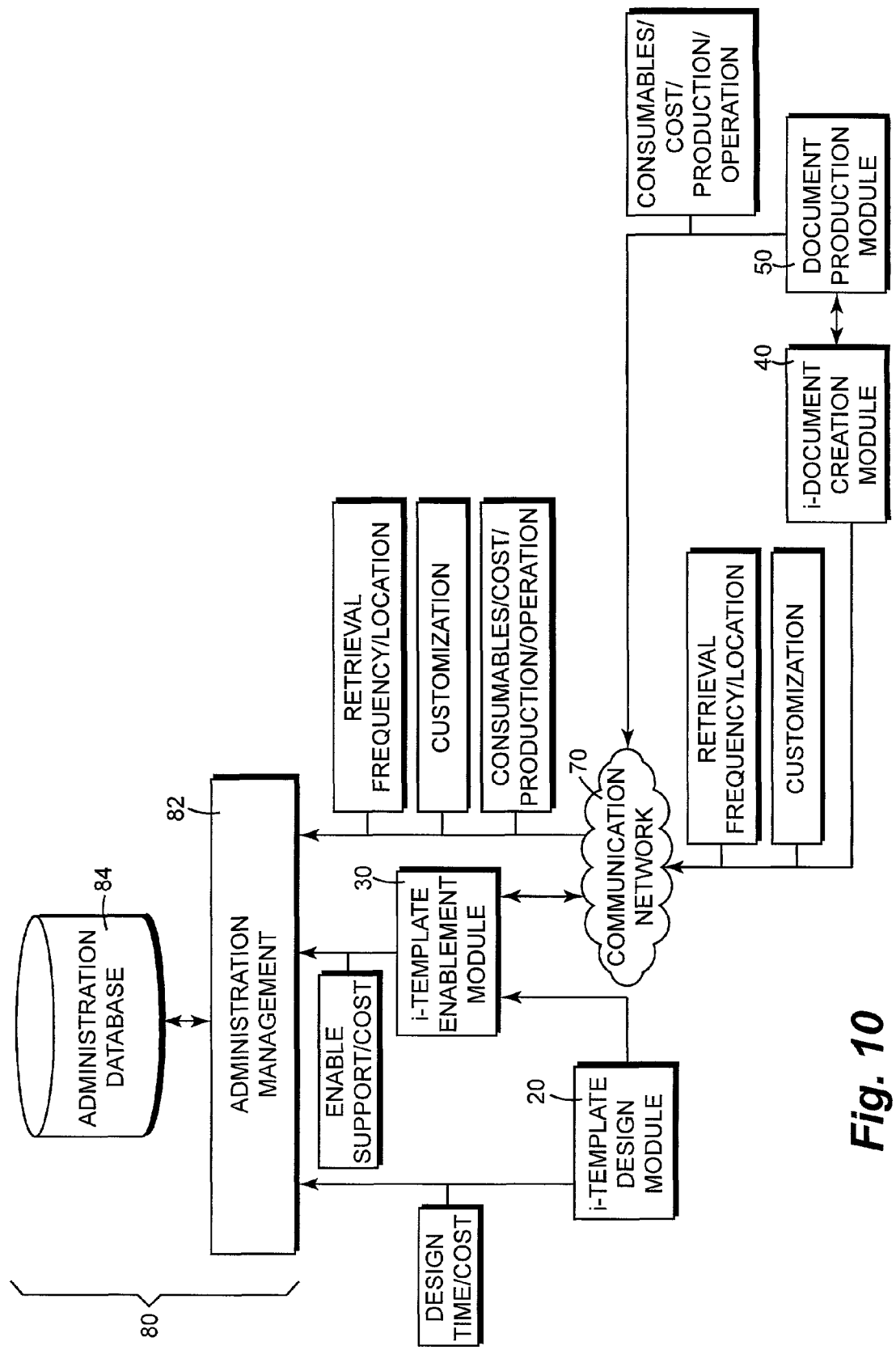
FIG. 10 is a block diagram illustrating one exemplary embodiment of monitoring the document production system of FIG. 9.

As illustrated in FIG. 10, administration module 80 monitors design and enablement of i-template 12, retrieval and customization of i-template 12, and/or production of customized/personalized document 16. More specifically, at i-template design module 20, administration module 80 monitors time and/or cost to design i-template 12 (FIG. 2). At i-template enablement module 30, administration module 80 monitors, for example, support for maintaining i-template 12 and/or cost to enable i-template 12 (FIG. 2). At i-document creation module 40, administration module 80 monitors, for example, frequency of retrieval of i-template 12, location from which i-template 12 is retrieved, and/or an extent of customization of i-template 12 (FIG. 3). At document production module 50, administration module 80 monitors consumables data, cost data, production data, and/or operational data for producing customized/personalized document 16 (FIG. 3). In one exemplary embodiment, administration module 80 monitors i-document creation module 40 and document production module 50 via communication network 70. As such, monitored data of i-document creation module 40 and document production module 50 is communicated with administration module 80 via communication network 70.

Consumables data monitored at document production module 50 includes, for example, print media level and/or print media usage of document production module 50, such as paper, marking material level and/or marking material usage of document production module 50, such as toner or ink, and/or finishing supplies usage of document production module 50, such as staples, stitching, or bindings. Cost data monitored at document production module 50 includes, for example, equipment, material, and/or distribution costs of document production module 50. Production data monitored at document production module 50 includes, for example, a status of producing customized/personalized document 16, including time to produce customized/personalized document 16, and/or a number of pages processed by document production module 50, including a number of pages of customized/personalized document 16. Operational data monitored at document production module 50 includes, for example, availability of document production module 50 to produce customized/personalized document 16 and/or turn-around or lead time of document production module 50 to produce customized/personalized document 16.

In one exemplary embodiment, to monitor and manage document production system 10, administration module 80 includes an administration management system 82 and an administration database 84. Administration management system 82 receives and processes monitored information and/or data for document production system 10. As such, administration database 84 stores monitored and/or processed information and/or data of document production system 10. Examples of administration database 84 include non-volatile memory (e.g., a hard disk drive or other persistent storage device) and may include volatile memory (e.g., random access memory (RAM)). Another example of administration database 84 includes a relational database management server (RDBMS).

In one exemplary embodiment, administration module 80 manages document production system 10 based on monitored information and/or data. For example, based on consumables data of document production module 50, administration module 80 maintains a consumables supply for producing customized/personalized document 16. As such, administration module 80 forecasts a consumables supply for document production module 50 and replenishes the consumables supply as necessary. In addition, based on production and/or operational data of document production module 50, administration module 80 distributes production of customized/personalized document 16 between or among different document production modules 50, as described below.

Figure 11:
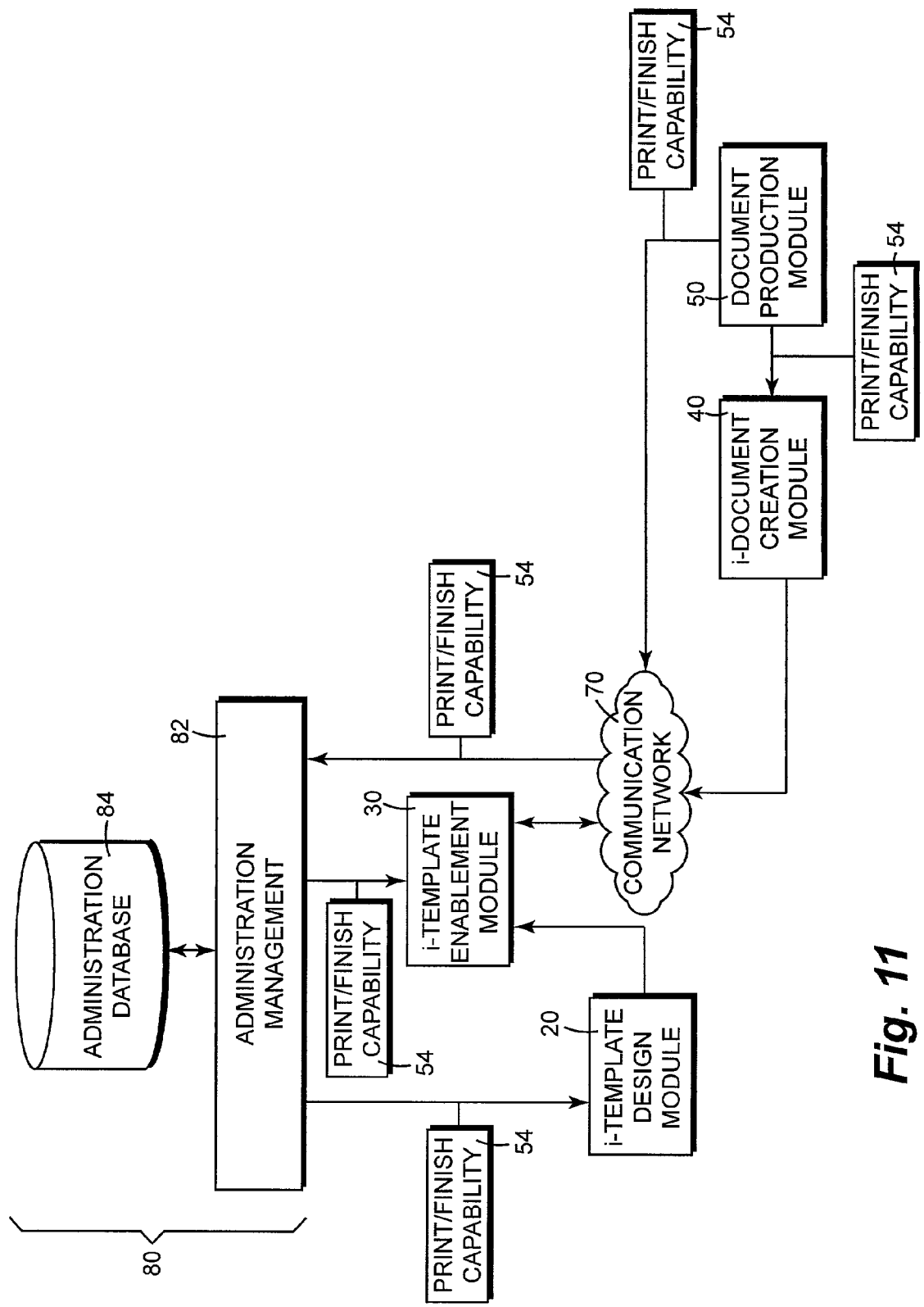
FIG. 11 is a block diagram illustrating one exemplary embodiment of registering printing and finishing capability in the document production system of FIG. 9.

In one exemplary embodiment, as illustrated in FIG. 11, a capability 54 of printing and finishing system 52 (FIG. 3) of document production module 50 is registered with administration module 80. In addition, capability 54 is registered or communicated with i-document creation module 40. Capability 54 identifies printing and finishing attributes and/or options of printing and finishing system 52, as described below. Preferably, capability 54 of printing and finishing system 52 is communicated with i-template design module 20 and/or i-template enablement module 30 via administration module 80. In one exemplary embodiment, capability 54 is registered with administration module 80 via communication network 70 and communicated with i-template design module 20 and i-template enablement module 30 from administration module 80, and registered or communicated with i-document creation module 40 directly from document production module 50.

With capability 54 of printing and finishing system 52 communicated with i-template design module 20, i-template enablement module 30, and i-document creation module 40, i-template 12 is designed, enabled, retrieved, and/or customized based on capability 54. For example, design of i-template 12 is based on capability 54 of printing and finishing system 52 by including or identifying one or more options of printing and finishing system 52 with i-template 12. For example, enablement of i-template 12 is based on capability 54 of printing and finishing system 52 by limiting i-template 12 for use with printing and finishing system 52. For example, retrieval of i-template 12 is based on capability 54 of printing and finishing system 52 by selecting i-template 12 as specified for printing and finishing system 52. For example, customization of i-template 12 is based on capability 54 of printing and finishing system 52 by selecting one or more options of printing and finishing system 52 from i-template 12.

In one exemplary embodiment, administration management system 82 of administration module 80 receives and transfers capability 54 of printing and finishing system 52 to administration database 84. As such, administration database 84 stores capability 54 of printing and finishing system 52 for subsequent retrieval and processing. More specifically, when administration management system 82 receives capability 54 from printing and finishing system 52, capability 54 is stored as a data file in administration database 84. Administration management system 82, therefore, subsequently retrieves capability 54 from administration database 84 for processing.

In one exemplary embodiment, document production system 10 utilizes a network management protocol to register capability 54 of printing and finishing system 52 with administration module 80. An example of a network management protocol suitable for use with document production system 10 includes a simple network management protocol (SNMP). As an SNMP-compliant device, printing and finishing system 52 stores data about itself, including, for example, capability 54, and returns this data to administration module 80, as an SNMP requester, when requested by administration module 80. Another example of a network management protocol suitable for use with document production system 10 includes a remote monitoring (RMON) network management protocol.

In another exemplary embodiment, document production system 10 utilizes cookies to register capability 54 of printing and finishing system 52 with administration module 80. More specifically, administration module 80 gathers information specifying capability 54 from document production module 50 and stores the information as cookies on document production module 50 such that when document production module 50 communicates with administration module 80, document production module 50 sends the information to administration module 80. Thus, capability 54 of printing and finishing system 52 is stored at printing and finishing system 52.

Figure 12:
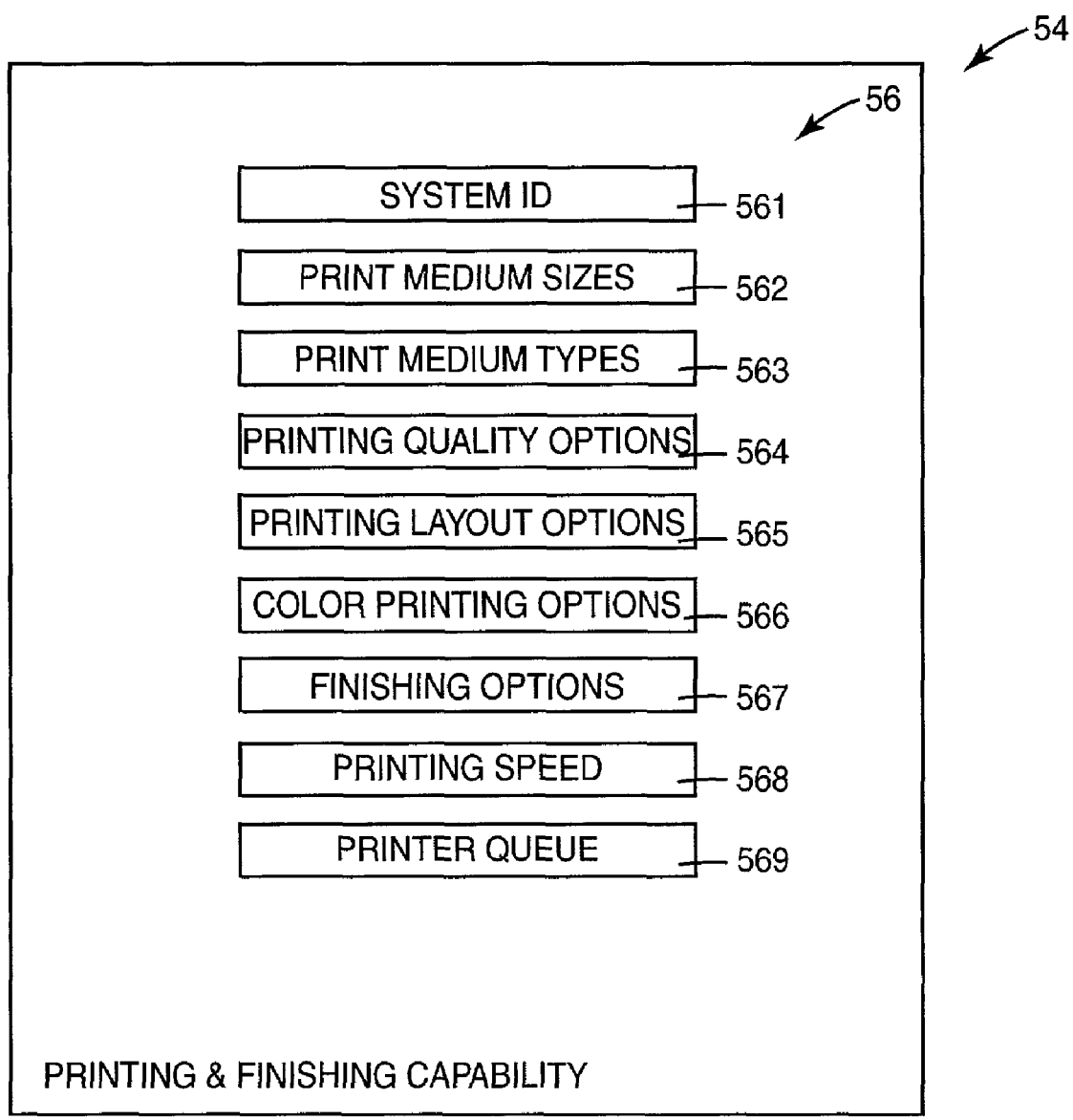
FIG. 12 is a diagram illustrating one exemplary embodiment of capability of a printing and finishing system registered in the document production system of FIG. 9.

In one exemplary embodiment, as illustrated in FIG. 12, capability 54 of printing and finishing system 52 includes a plurality of capability attributes 56 which define characteristics of printing and finishing system 52. Capability attributes 56 include, for example, a printing and finishing system identification attribute 561, a print medium sizes attribute 562, a print medium types attribute 563, a printing quality options attribute 564, a printing layout options attribute 565, a color printing options attribute 566, a finishing options attribute 567, a printing speed attribute 568, and a printer queue attribute 569.

Printing and finishing system identification attribute 561 identifies, for example, a name and a location of printing and finishing system 52. Print medium sizes attribute 562 identifies different sizes of print medium upon which printing and finishing system 52 is capable of printing. Examples of different print medium sizes include a Letter-size, a Legal-size, and an A4-size of print medium. Print medium types attribute 563 identifies different types of print medium upon which printing and finishing system 52 is capable of printing. Examples of different print medium types include Plain Paper, Bond Paper, and Transparencies.

Printing quality options attribute 564 identifies different printing qualities that printing and finishing system 52 is capable of printing. An example of printing quality includes different printing resolutions such as 1200 dpi, 600 dpi, 300 dpi, etc. Printing layout options attribute 565 identifies different printing layouts that printing and finishing system 52 is capable of printing. Examples of different printing layout options include Portrait and Landscape, and Single-Sided and Double-Sided. Color printing options attribute 566 identifies different color printing options that printing and finishing system 52 is capable of printing. Examples of different color printing options include Color Printing, Gray Scale Printing, and Monochrome Printing.

Finishing options attribute 567 identifies different finishing options that printing and finishing system 52 is capable of providing. Examples of different finishing options include Stapled, Bound, Side-Stitched, Three-Hole Punched. Printing speed attribute 568 identifies a printing speed of printing and finishing system 52. Examples of different printing speeds include, for example, 17 pages per minute, 24 pages per minute, and 32 pages per minute. Printer queue attribute 569 identifies, for example, a wait time for printing at printing and finishing system 52 and an order of printing at printing and finishing system 52.

It is understood that additional print medium sizes, print medium types, printing quality options, printing layout options, color printing options, finishing options, and printing speeds, as are well known in the art, may be identified with print medium sizes attribute 562, print medium types attribute 563, printing quality options attribute 564, print layout options attribute 565, color printing options attribute 566, finishing options attribute 567, and printing speed attribute 568, respectively.

Figure 13:
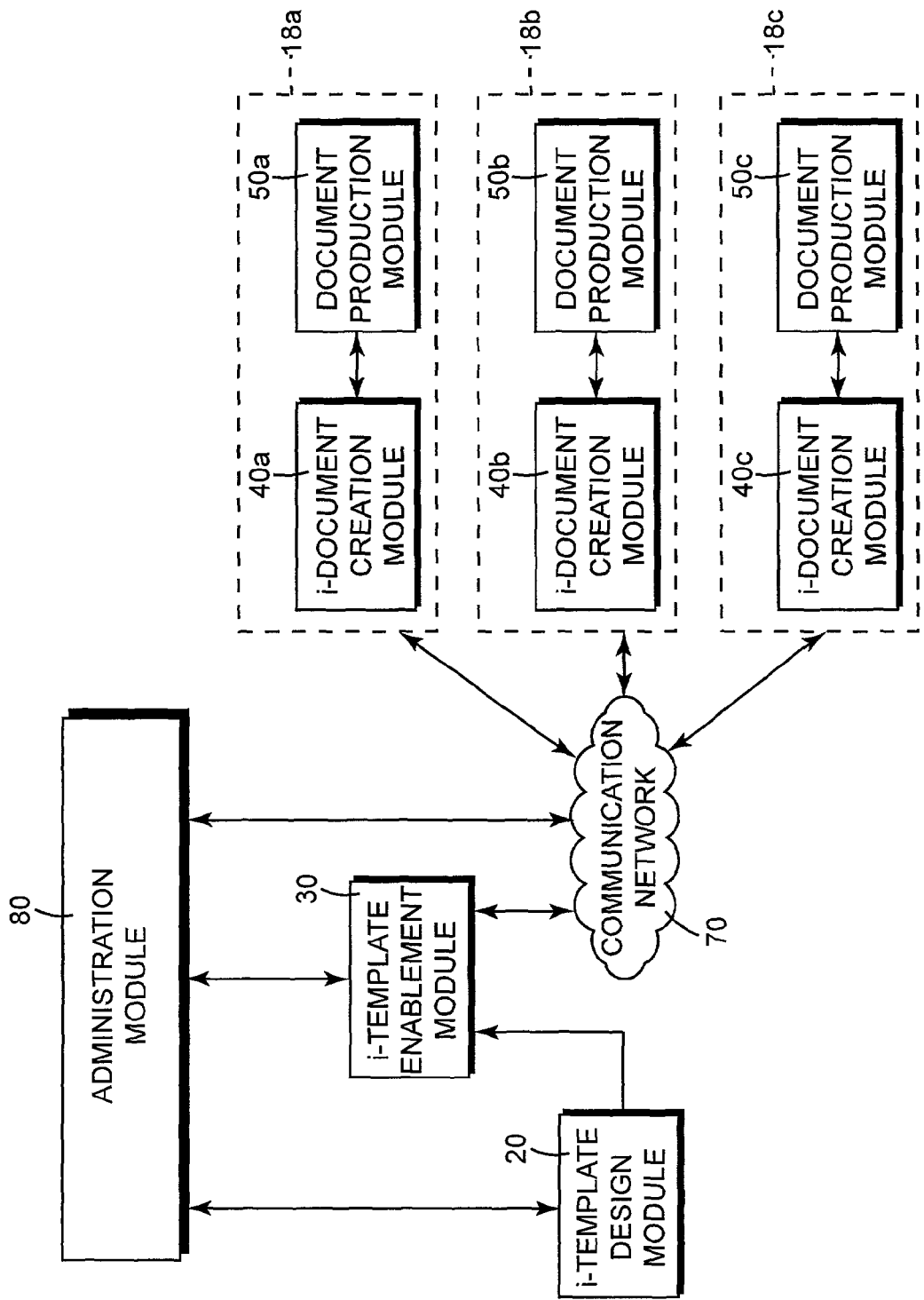
FIG. 13 is a block diagram illustrating another exemplary embodiment of a document production system including multiple points-of-need according to the present invention.

In one exemplary embodiment, as illustrated in FIG. 13, document production system 10 is available from multiple points-of-need. As such, document production system 10 includes, for example, an i-document creation module 40a and a document production module 50a located at a point-of-need 18a, an i-document creation module 40b and a document production module 50b located at a point-of-need 18b, an i-document creation module 40c and a document production module 50c located at a point-of-need 18c, etc. Thus, descriptions of i-document creation module 40 and document production module 50 provided above are also applicable to i-document creation modules 40a, 40b, 40c and document production modules 50a, 50b, 50c, respectively. Accordingly, the same and/or multiple users 62 (FIG. 3) can create one or more customized/personalized documents 16 at various points-of-need.

In one exemplary embodiment, administration module 80 monitors and manages i-document creation modules 40a, 40b, 40c and document production modules 50a, 50b, 50c of the respective points-of-need 18a, 18b, 18c and has capability 54 of respective printing and finishing systems 52 of document production modules 50a, 50b, 50c registered therewith. As such, administration module 80 monitors consumables data, cost data, production data, and/or operational data of document production modules 50a, 50b, 50c. Thus, administration module 80 can distribute production of customized/personalized document 16 among and/or to different document production modules 50a, 50b, 50c provided at different points-of-need 18a, 18b, 18c, respectively, and maintain a consumables supply for producing customized/personalized document 16 at document production modules 50a, 50b, 50c.

Figure 14:
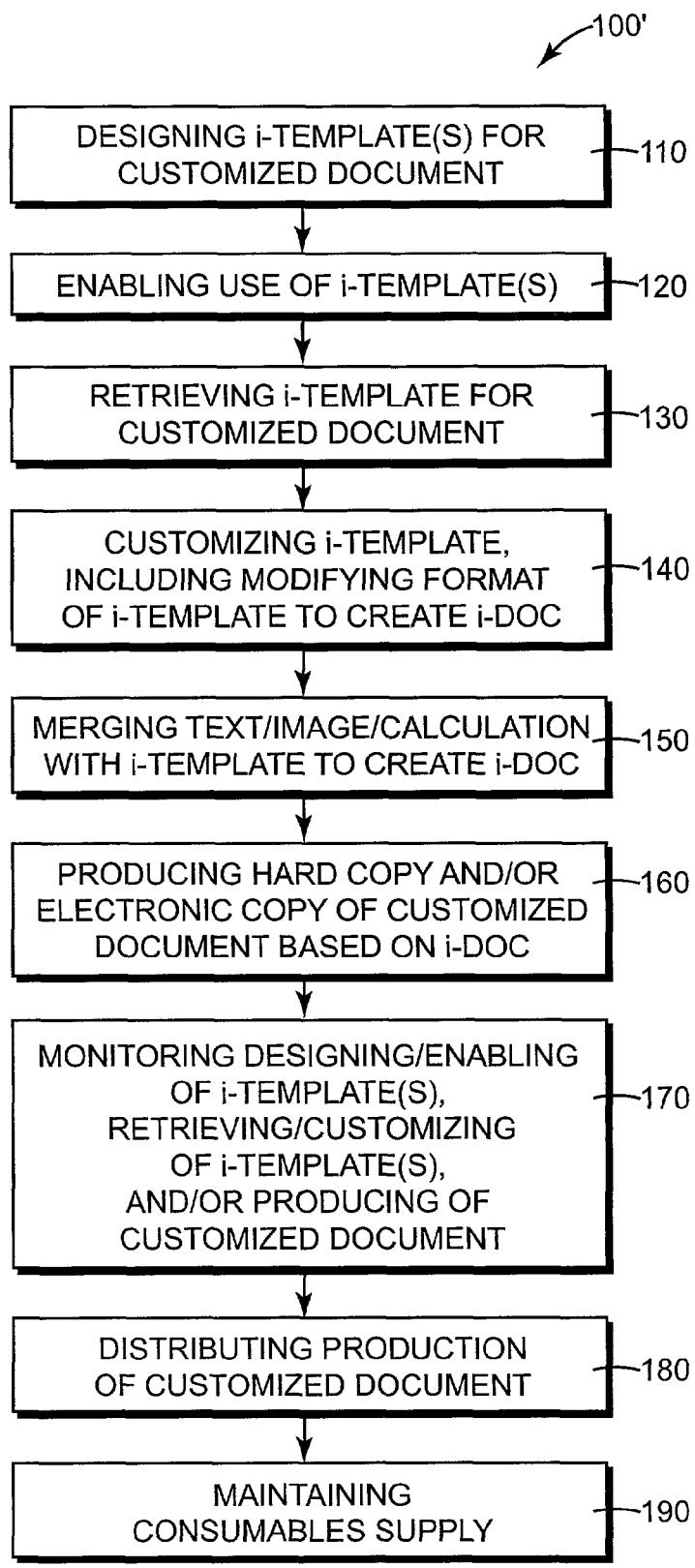
FIG. 14 is a flow diagram illustrating one exemplary embodiment of a method of administrating production of a customized document according to the present invention.

In FIG. 14, a flow diagram illustrating another exemplary embodiment of a method of producing customized/personalized document 16, including administrating production of customized/personalized document 16, according to the present invention is illustrated generally at 100'. Reference is also made to FIGS. 1-13.

Method 100', similar to method 100, includes steps 110-160, as described above with reference to FIG. 5. As such, at steps 110 and 120, one or more i-templates 12 for customized/personalized document 16 are designed and enabled for use. In addition, at steps 130, 140, and 150 i-template 12 is retrieved and customized and/or personalized to create i-doc 14 with variable data 45 being merged with i-template 12 and the format of i-template 12 being modified to accommodate variable data 45. Furthermore, at step 160, a hard copy and/or an electronic copy of customized/personalized document 16 is produced based on i-doc 14.

Method 100', however, also includes steps 170, 180, and/or 190, as described below. At step 170, designing and enabling use of i-template 12, retrieving and customizing i-template 12, and/or producing customized/personalized document 16, as performed in steps 110 and 120, steps 130, 140, and 150, and step 160, respectively, is monitored. Monitoring is performed, for example, by administration module 80, as described above with reference to FIG. 10. More specifically, administration module 80 monitors and/or manages operation and/or activities of i-template design module 20, i-template enablement module 30, i-document creation module 40, and/or document production module 50. For example, design time and/or design cost of i-template 12 is monitored at i-template design module 20, support for and/or cost of enabling i-template 12 is monitored at i-template enablement module 30, retrieval frequency and/or retrieval location for i-template 12 and/or extent of customization of i-template 12 is monitored at i-document creation module 50, and/or consumables data, cost data, production data, and/or operational data for producing customized/personalized document 16 is monitored at document production module 50.

At step 180, production of customized/personalized document 16 is distributed based on an availability of document production module 50 to produce customized/personalized document 16. More specifically, when multiple document production modules such as document production modules 50a, 50b, 50c are available, administration module 80 can distribute production of customized/personalized document 16 between document production modules 50. For example, if user 62 interacts with i-document creation module 40a associated with document production module 50a to create customized/personalized document 16 and document production module 50a is unavailable, administration module 80 can distribute production of customized/personalized document 16 to document production module 50b and/or document production module 50c. Administration module 80 can distribute production of customized/personalized document 16 based, for example, on a location of document production module 50 and/or capability 54 of printing and finishing system 52 of document production module 50 to produce customized/personalized document 16.

At step 190, a consumables supply for producing customized/personalized document 16 is maintained. More specifically, consumables for producing customized/personalized document 16, such as print media, marking material, and/or finishing supplies for printing and finishing system 52 of document production module 50 are maintained by administration module 80. In one exemplary embodiment, administration module 80 predicts or forecasts the consumables supply for document production module 50, including the consumables supply for producing customized/personalized document 16, and automatically reorders or replenishes the consumables supply for document production module 50.

In one exemplary embodiment, steps 170-190 of method 100' are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

Figure 15:
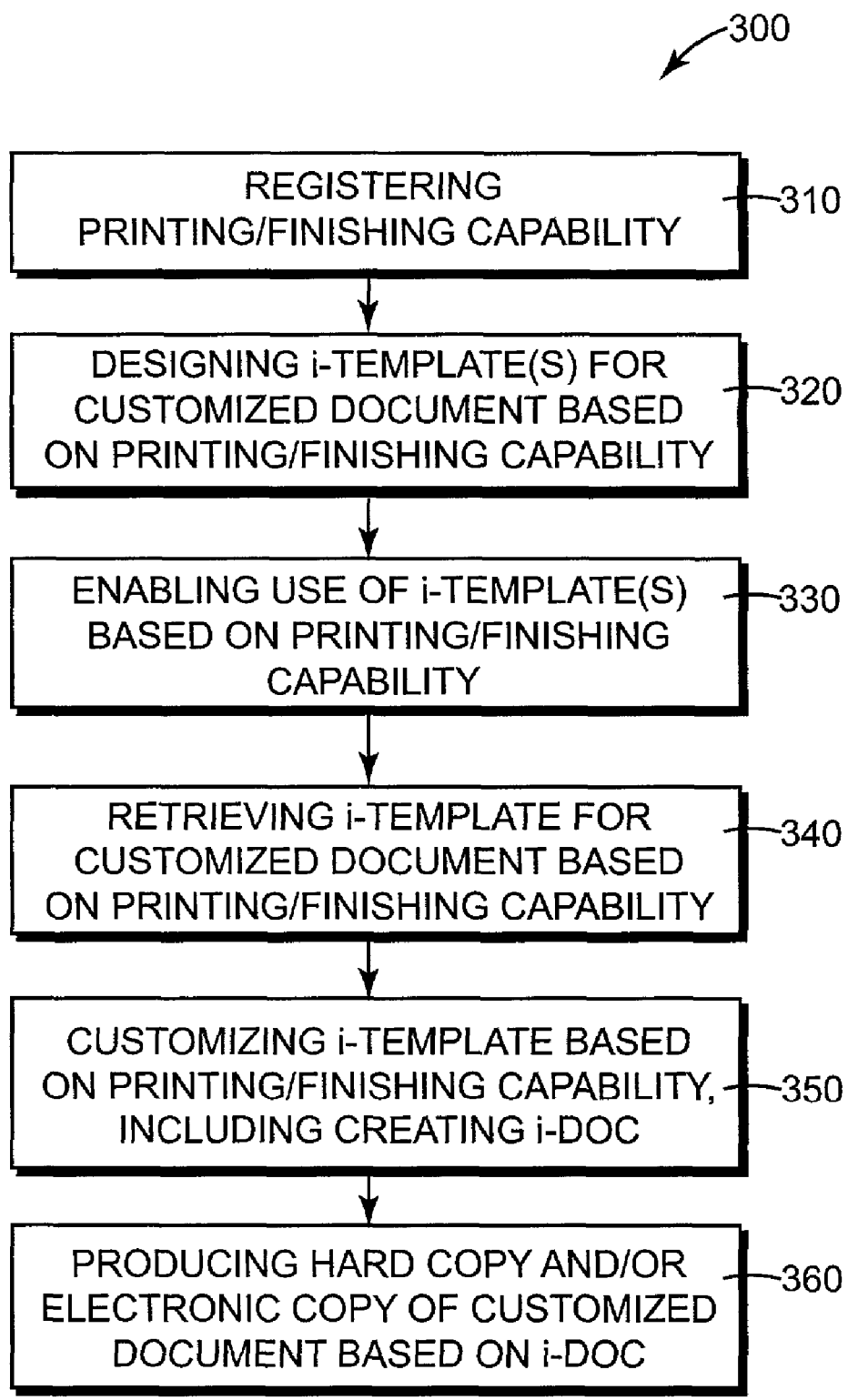
FIG. 15 is a flow diagram illustrating another exemplary embodiment of a method of producing a customized document according to the present invention.

In FIG. 15, a flow diagram illustrating another exemplary embodiment of a method of producing customized/personalized document 16, including registering capability 54 of printing and finishing system 52, according to the present invention is illustrated generally at 300. Reference is also made to FIGS. 1-14.

At step 310, capability 54 of printing and finishing system 52 is registered. More specifically, capability 54 of printing and finishing system 52 of document production module 50 is communicated with i-template design module 20, i-template enablement module 30, and/or i-document creation module 40. In one exemplary embodiment, capability 54 is registered with administration module 80 via communication network 70, and communicated with i-template design module 20 and i-template enablement module 30 via administration module 80, as illustrated and described above with reference to FIG. 11.

At step 320, one or more i-templates 12 for customized/personalized document 16 are designed based on capability 54 of printing and finishing system 52. I-template 12 is designed based on capability 54 by, for example, considering capability 54 and including or identifying one or more options of printing and finishing system 52 with i-template 12.

At step 330, i-template 12 is enabled for use based on capability 54 of printing and finishing system 52. I-template 12 is enabled for use based on capability 54 by, for example, limiting i-template 12 for use with printing and finishing system 52.

At step 340, i-template 12 for customized/personalized document 16 is retrieved based on capability 54 of printing and finishing system 52. I-template 12 is retrieved based on capability 54 by, for example, selecting i-template 12 as specified for printing and finishing system 52.

At step 350, i-template 12 is customized based on capability 54 of printing and finishing system 52 and i-doc 14 is created. I-template 12 is customized based on capability 54 by, for example, selecting one or more options of printing and finishing system 52 from i-template 12.

At step 360, a hard copy and/or an electronic copy of customized/personalized document 16 is produced based on i-doc 14. A hard copy of customized/personalized document 16 is produced, for example, by printing and finishing system 52 of document production module 50.

In one exemplary embodiment, steps 310-360 of method 300 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

By including administration module 80 in document production system 10, operations and/or activities of document production system 10 including, more specifically, i-template design module 20, i-template enablement module 30, i-document creation module 40, and/or document production module 50, can be monitored and/or managed. For example, expense tracking, consumables forecasting, automatic consumables re-ordering, and/or reporting can be performed by administration module 80.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of producing a customized document, the method comprising:

registering a capability of a plurality of printing and finishing systems of a plurality of document production modules provided at different points-of-need with an administration module;

designing a plurality of intelligent templates for the customized document based on the capability of the printing and finishing systems of the document production modules at the different points-of-need;

retrieving at least one intelligent template for the customized document based on the capability of the printing and finishing systems of the document production modules at the different points-of-need, including selecting the at least one intelligent template as specified for a respective printing and finishing system at a respective point-of-need;

customizing the at least one intelligent template based on the capability of the respective printing and finishing system at the respective point-of-need, including creating an intelligent document;

distributing, by the administration module, production of the customized document to a respective document production module including the respective printing and finishing system at the respective point-of-need; and producing the customized document with the respective printing and finishing system at the respective point-of-need based on the intelligent document.

2. The method of claim 1, wherein registering the capability of the printing and finishing systems includes registering a print media capability, a print quality capability, a printing layout capability, a color printing capability, a finishing capability, a printing speed, and a printer queue.

3. The method of claim 1, wherein registering the capability of the printing and finishing systems includes maintaining a database including the capability of the printing and finishing systems.

4. The method of claim 3, further comprising:
linking the printing and finishing systems and the database including the capability of the printing and finishing systems via a communication network, wherein registering the capability of the printing and finishing systems includes registering the capability of the printing and finishing systems via the communication network.

5. The method of claim 1, wherein designing the intelligent templates based on the capability of the printing and finishing systems includes identifying at least one option of the printing and finishing systems with a respective intelligent template.

6. The method of claim 1, further comprising:
enabling use of the intelligent templates based on the capability of the printing and finishing systems.

7. The method of claim 6, wherein enabling use of the intelligent templates based on the capability of the printing and finishing systems includes limiting the intelligent templates for use with respective printing and finishing systems.

8. The method of claim 1, wherein customizing the at least one intelligent template based on the capability of the respective printing and finishing system includes selecting at least one option of the respective printing and finishing system from the at least one intelligent template.

9. The method of claim 1, wherein distributing, by the administration module, production of the customized document to a respective document production module including the respective printing and finishing system at the respective point-of-need includes distributing, by the administration module, production of the customized document among different document production modules provided at different points-of-need.

10. The method of claim 1, wherein distributing, by the administration module, production of the customized document to a respective document production module including the respective printing and finishing system at the respective point-of-need includes distributing, by the administration module, production of the customized document to different document production modules provided at different points-of-need.

11. The method of claim 1, further comprising:
monitoring, by the administration module, consumables data, cost data, production data, and operational data of document production modules provided at different points-of-need; and maintaining, by the administration module, a consumables supply of document production modules provided at different points-of-need.

12. A system for producing a customized document, the system comprising:
an administration module including a database having a capability of a plurality of printing and finishing systems of a plurality of document production modules at different points-of-need registered therewith;

an intelligent template design module adapted to facilitate design of a plurality of intelligent templates for the customized document based on the capability of the printing and finishing systems of the document production modules at the different points-of-need; and an intelligent document creation module adapted to facilitate retrieval of at least one intelligent template for the customized document based on the capability of the printing and finishing systems of the document production modules at the different points-of-need, including selection of the at least one intelligent template as specified for a respective printing and finishing system at a respective point-of-need, and facilitate customization of the at least one intelligent template based on the capability of the respective printing and finishing system at the respective point-of-need to create an intelligent document;

the administration module adapted to distribute production of the customized document to a respective document production module including the respective printing and finishing system at the respective point-of-need to produce the customized document with the respective printing and finishing system at the respective point-of-need based on the intelligent document.

13. The system of claim 12, wherein the capability of the printing and finishing systems includes a print media capability, a print quality capability, a printing layout capability, a color printing capability, a finishing capability, a printing speed, and a printer queue.

14. The system of claim 12, further comprising:
a communication network configured to link the printing and finishing systems and the database having the capability of the printing and finishing systems registered therewith, wherein the printing and finishing systems are adapted to register the capability thereof with the database via the communication network.

15. The system of claim 12, wherein design of the intelligent templates based on the capability of the printing and finishing systems includes identification of at least one option of the printing and finishing systems with a respective intelligent template.

16. The system of claim 12, further comprising:
an intelligent template enablement module adapted to facilitate use of the intelligent templates based on the capability of the printing and finishing systems.

17. The system of claim 16, wherein use of the intelligent templates based on the capability of the printing and finishing systems includes limitation of the intelligent templates for use with respective printing and finishing systems.

18. The system of claim 12, wherein customization of the at least one intelligent template based on the capability of the respective printing and finishing system includes selection of at least one option of the respective printing and finishing system from the at least one intelligent template.

19. The system of claim 12, wherein the administration module adapted to distribute production of the customized document to a respective document production module including the respective printing and finishing system at a respective point-of-need includes the administration module adapted to distribute production of the customized document among different document production modules provided at different points-of-need.

20. The system of claim 12, wherein the administration module adapted to distribute production of the customized document to a respective document production module including the respective printing and finishing system at a respective point-of-need includes the administration module adapted to distribute production of the customized document to different document production modules provided at different points-of-need.

21. The system of claim 12, further comprising:
the administration module adapted to monitor consumables data, cost data, production data, and operational data of document production modules provided at different points-of-need.

22. The system of claim 12, further comprising:
the administration module adapted to maintain a consumables supply of document production modules provided at different points-of-need.

* * * * *